US008336569B2

(12) United States Patent
Lohr et al.

(10) Patent No.: US 8,336,569 B2

(45) Date of Patent: Dec. 25, 2012

(54) MIXING EDUCTOR

(75) Inventors: James H. Lohr, Union Grove, WI (US); John A. Boticki, Racine, WI (US); James L. Bournoville, Racine, WI (US)

(73) Assignee: Diversey, Inc., Sturtevant, WI (US)

( * ) Notice: Subject to any disclaimer, the term of this patent is extended or adjusted under 35 U.S.C. 154(b) by 50 days.

(21) Appl. No.: 13/154,197

(22) Filed: Jun. 6, 2011

(65) Prior Publication Data

US 2011/0232774 A1 Sep. 29, 2011

Related U.S. Application Data

(63) Continuation of application No. 11/997,641, filed as application No. PCT/US2006/029315 on Jul. 27, 2006, now Pat. No. 7,954,507.

(51) Int. Cl.
*F16K 15/14* (2006.01)

(52) U.S. Cl. .......................... 137/12; 137/218; 137/895

(58) Field of Classification Search .................. 251/124, 251/142; 137/2, 3, 12, 216, 217–218, 888, 137/895

See application file for complete search history.

(56) References Cited

U.S. PATENT DOCUMENTS

| | | | | |
|---|---|---|---|---|
| 3,263,702 | A | | 8/1966 | Pullen et al. |
| 3,298,669 | A | * | 1/1967 | Zingg ........................... 239/311 |
| 3,906,996 | A | | 9/1975 | DePass et al. |
| 4,634,559 | A | * | 1/1987 | Eckert ............................... 137/3 |
| 5,072,599 | A | | 12/1991 | Simone |
| 5,159,958 | A | | 11/1992 | Sand |
| 5,253,677 | A | | 10/1993 | Sand |
| 5,522,419 | A | | 6/1996 | Sand |
| 5,673,725 | A | | 10/1997 | Russell et al. |
| 5,758,691 | A | | 6/1998 | Nedderman, Jr. |
| 5,839,474 | A | * | 11/1998 | Greaney ........................ 137/216 |
| 5,862,829 | A | | 1/1999 | Sand |
| 5,927,338 | A | | 7/1999 | Boticki et al. |
| 6,098,662 | A | | 8/2000 | Gregoire |
| 6,240,983 | B1 | | 6/2001 | Beldham et al. |
| 6,279,598 | B1 | | 8/2001 | Boticki et al. |
| 2003/0034078 | A1 | | 2/2003 | Haas |

FOREIGN PATENT DOCUMENTS

| | | |
|---|---|---|
| EP | 1353012 | 10/2003 |
| WO | 03/084428 | 10/2003 |
| WO | 03/087483 | 10/2003 |

OTHER PUBLICATIONS

International Search Report from the European Patent Office, mailed Nov. 16, 2006.

U.S. Office Action mailed May 29, 2007 for U.S. Appl. No. 11/195,052, filed Aug. 2, 2005.

U.S. Office Action mailed Sep. 19, 2007 for U.S. Appl. No. 11/195,052, filed Aug. 2, 2005.

* cited by examiner

*Primary Examiner* — John Bastianelli

(74) *Attorney, Agent, or Firm* — Michael Best & Friedrich LLP

(57) ABSTRACT

An eductor for mixing two liquids wherein the eductor includes a closed or non-air gap back flow prevention member. The vacuum profile of the eductor is altered by changing an opening in a passage portion to controllably divert water flow around the venturi tube or diverting the water without the opening. This affords the changing of the vacuum profile without redesigning the entire eductor.

20 Claims, 5 Drawing Sheets

MIXING EDUCTOR

RELATED APPLICATIONS

This patent application is a continuation of and claims priority to U.S. patent application Ser. No. 11/997,641 filed Feb. 1, 2008 and issued on Jun. 7, 2011 as U.S. Pat. No. 7,954,507, which is a 371 national-stage entry application of PCT Application No. PCT/US06/029315 filed on Jul. 27, 2006, which claims priority to U.S. patent application Ser. No. 11/195,052 filed on Aug. 2, 2005. Priority is hereby claimed to all of these patent applications, the entirety of each of which is hereby incorporated by reference.

TECHNICAL FIELD

This invention relates generally to apparatus employed in the mixing of chemical concentrate with a diluting liquid. More particularly, it relates to an eductor for drawing chemical concentrate from a container and into the diluting liquid wherein the reduced pressure in the eductor can be easily adjusted.

BACKGROUND

The use of eductors for mixing chemical concentrates into a stream of liquid to provide a diluted solution is well known. For example, see U.S. Pat. Nos. 5,927,338 and 6,279,598 issued to S.C. Johnson Commercial Markets, Inc., which teachings are incorporated herein by reference.

Eductors without an air gap are known. One is described in U.S. Pat. No. 6,240,983.

Certain advances in technologies and changes in regulatory communities have given rise to non-air gap means of backflow prevention. One of the new backflow prevention methods is to use an elastomer in a critical path in such a manner that if a back siphonage occurs, the elastomer will seal the path closed, thus preventing backflow. The atmosphere of an enclosed water supply system lends itself well to Herschel-type venturi systems. Vacuum profiles are based on standard inlet lengths, diameters and cone angles, which are proportional to exit throat lengths, diameters and cone angles. To change a vacuum profile requires a redesign of the entire venturi.

The prior art does not provide a non-air gap eductor wherein the vacuum profile can be changed without redesigning the entire venturi.

The objects of certain embodiments of the invention therefore are:

Providing an improved eductor for a mixing and dispensing apparatus.

Providing an improved non-air gap eductor.

Providing an improved non-air gap eductor wherein the vacuum profile can be changed without redesigning the entire unit.

Providing an improved non-air gap eductor of the foregoing type which can be easily retrofitted.

Providing an improved non-air gap eductor of the foregoing type which can be manufactured at minimal cost.

SUMMARY

The foregoing objects are accomplished and the shortcomings of the prior art are overcome by the eductor of this invention which in one embodiment includes a body member providing a longitudinal axis. A flow path extends longitudinally through the body member, the flow path defined by a first flow guide and a second flow guide, the second flow guide constructed and arranged to receive liquid from the first flow guide. A closed back flow prevention member is operatively associated with the first flow guide. A venturi tube is positioned in the flow path for receiving liquid from the second flow guide, the second flow guide and the venturi tube are connected by a passage portion. There is an opening in the passage, the opening is constructed and arranged to produce a desired vacuum in the venturi tube. At least one channel is provided laterally to the longitudinal axis for flowing a liquid concentrate into the venturi tube. The flow path further includes a discharge passage extending from the venturi tube to the outside of the body member.

In one aspect the channel includes a check valve and there are present two lateral channels.

In another embodiment the eductor includes a body member providing a longitudinal axis. A flow path extends longitudinally through the body member, the flow path defined by a first flow guide and a second flow guide, the second flow guide constructed and arranged to receive liquid from the first flow guide. A closed backflow prevention member is operatively associated with the first flow guide. A venturi tube is positioned in the flow path for receiving liquid from the second flow guide, the second flow guide and the venturi tube are connected by a passage portion. There is an opening in the passage. The second flow guide is defined by a tubular portion extending over the opening in the passage. At least one channel is provided laterally to the longitudinal axis for flowing a liquid concentrate into the venturi tube. The flow path further including a discharge passage extending from the venturi tube to the outside of the body member. The extension of the tubular portion over the opening in the passage is designed to afford a desired vacuum profile.

In still another embodiment, the eductor includes a body member providing a longitudinal axis. A flow path extends longitudinally through the body member, the flow path defined by a first flow guide and a second flow guide, the second flow guide constructed and arranged to receive liquid from the first flow guide. A closed back flow prevention member is operatively associated with the first flow guide. A venturi tube is positioned in the flow path for receiving liquid from the second flow guide, the first flow guide and the second flow guide positioned in a spaced relationship so as to divert some of the liquid from the venturi tube to produce a desired vacuum in the venturi tube. At least one channel lateral to the longitudinal axis for flowing a liquid concentrate into the venturi tube. The flow path further including a discharge passage extending from the venturi tube to the outside of the body member.

In yet another aspect there is a method of establishing a vacuum profile in a closed back flow prevention eductor which includes modifying the opening in a passage of the eductor.

In another aspect the second flow guide and the tubular portion are in the form of a funnel member.

These and still other objects and advantages of the invention will be apparent from the description which follows. In the detailed description below, a preferred embodiment of the invention will be described in reference to the full scope of the invention. Rather, the invention may be employed in other embodiments.

Other aspects of the invention will become apparent by consideration of the detailed description and accompanying drawings.

DETAILED DESCRIPTION

Figure 1:
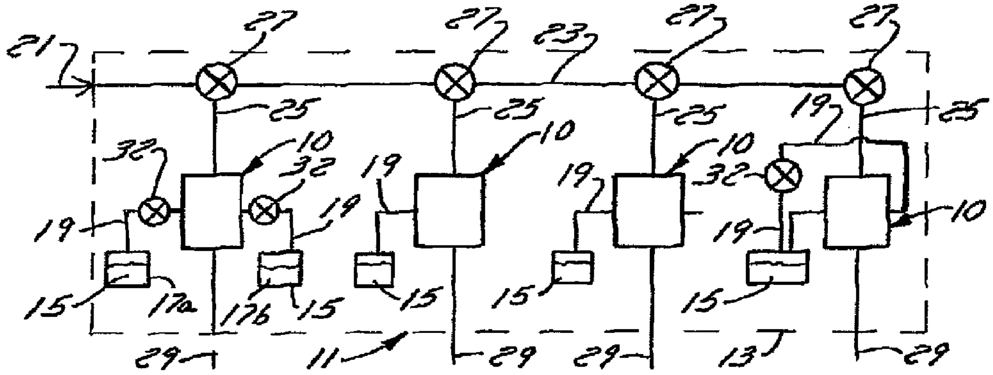
FIG. 1 is a schematic diagram of a type of dispensing equipment with which the new eductor may be used.

Referring to FIG. 1, there is shown a schematic diagram for a type of dispensing equipment generally in which the eductor 10 of the invention is employed. The equipment 11 has an enclosure 13 and containers 15 in the enclosure 13 or, possibly, outside the enclosure 13 but connected as shown by lines 19. Normally, each container 15 is filled with a different liquid 17*a* and 17*b*. But as explained below, there may be occasions where it is desirable to have two containers 15 filled with the same liquid 17.

The inlet line 21 of the equipment 11 is connected to a source of water feeding a header 23. Branch pipes 25 are connected to the header 23 and each branch pipe 25 includes a valve 27 "dedicated" to that pipe 25. When a particular valve 27 is actuated, water flows through the related eductor 10 and mixes a concentrated liquid 17 with such water to form a dilute solution. Each mixed dilute solution is dispensed through a separate tube 29. The amount of concentrate introduced to the eductor 10 can be controlled by the valves 32.

Figure 2:
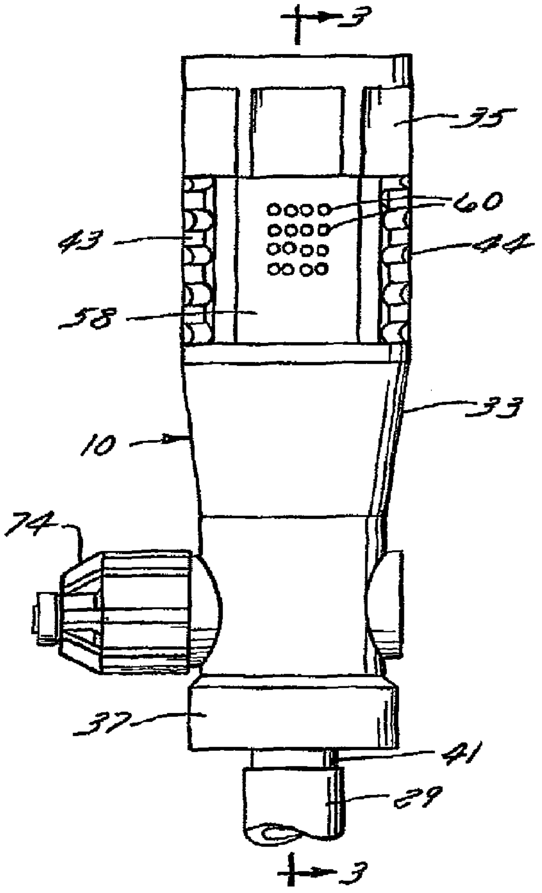
FIG. 2 is an elevational view of the eductor.

As seen in FIG. 2, the eductor 10 includes a generally tubular body 33 with two opposing ribs 43 and 44. It has an inlet end 35 and an outlet section 37, the latter having an outlet fitting 39 attached thereto. Such fitting 39 has a necked-down portion 41 for connection to outlet tube 29.

Figure 3:
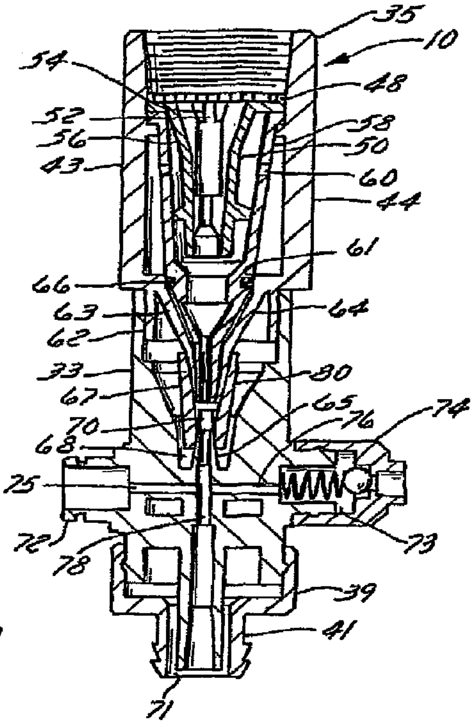
FIG. 3 is a sectional view of one embodiment of the invention.
Figure 4:
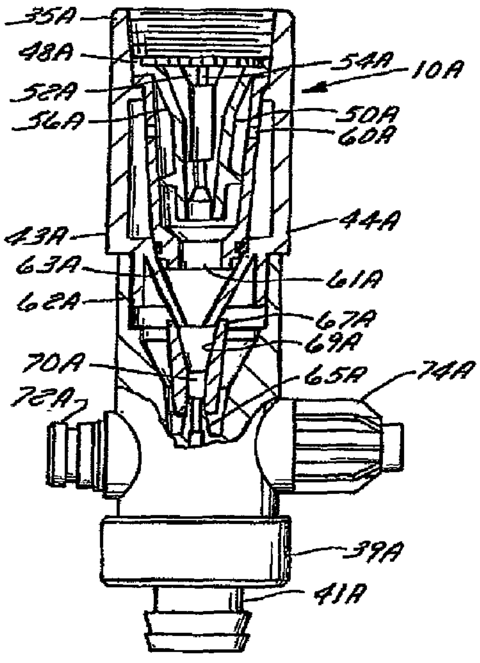
FIG. 4 is a sectional view of another embodiment of the invention.

As shown in FIG. 3, the inlet section 35 of eductor 10 includes a core structure 48 with a barrel 50 surrounded by the ribs 52. There are fluid outlets 54 at the top of barrel 50 as well as a resilient sleeve 56 and a seal ring 53. An outer casing 58 surrounds the resilient sleeve and has the vents 60. These previously described components are illustrated in PCT Application No. PCT/US03/08428, which teachings are incorporated by reference. Their function is described in this patent application and serve as a normally closed siphon-breaking air gap.

An outlet passage 61 communicates with a funnel member 64 or first flow guide seated in the conical section 63. A seal 66 is positioned between the outer casing 58 and the conical section 63. A second flow guide 67 is connected to the first flow guide 64 and the second flow guide 67 is connected to venturi tube 65 by a passage portion 69 provided by the funnel portion 80 of the first flow guide 64, the conical section 63, and the second flow guide 67. An opening 70 is provided in the passage portion 69 of the second flow guide 67.

Inlet section 35 is interconnected to the tubular body 33 by the connecting portion 62. It includes input connections 72 and 73 communicating with channels 75 and 76 which in turn communicate with passage 78. A check valve assembly, 74 preferably of the ball check type, is connected to input connection 73. It will be seen in FIG. 3 that check valve assembly 74 is shown on an opposing side from that shown in FIG. 2. Also, input connection 72 is shown.

The embodiments 10A, 10B and 10C illustrated in FIGS. 4, 8, 9 and 10 include many of the same components as described in FIG. 3, with similar numbers referring to similar components except with an "A", "B" or "C" suffix. One of the differences between embodiment 10 and embodiments 10A, 10B and 10C is that in embodiments 10A, 10B and 10C they do not include the funnel member 64.

Figure 5:
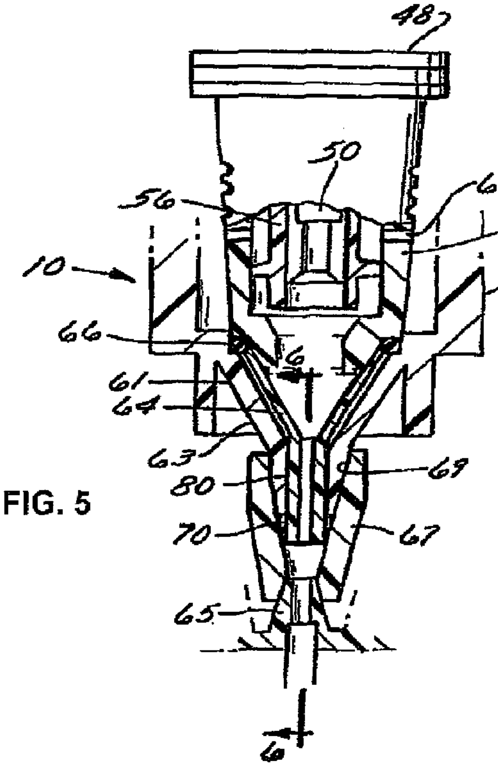
FIG. 5 is a partial enlarged view of the embodiment shown in FIG. 3.
Figure 6:
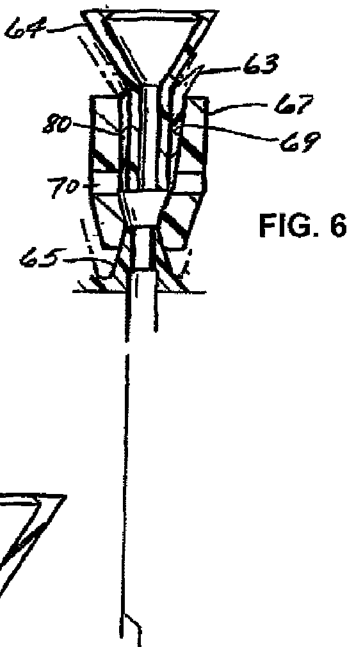
FIG. 6 is a partial enlarged view of the embodiment shown in FIG. 5 taken along line 6-6.
Figure 7:
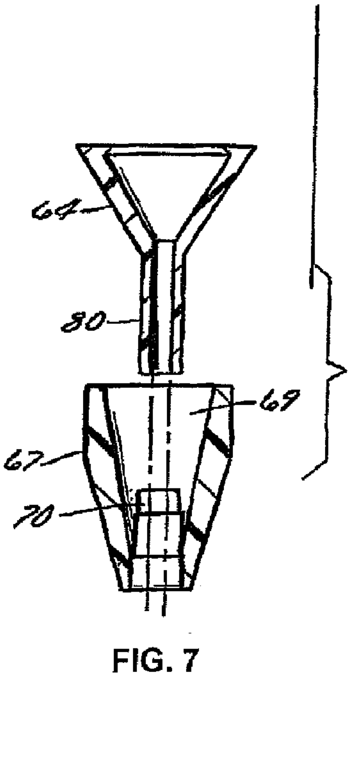
FIG. 7 is a view of the components shown in FIG. 6 with the components displaced.

As best illustrated in FIGS. 5-7, embodiment 10 shows the positioning of funnel stem 80 of funnel member 64 over a portion of the opening 70. The purpose of this is explained in the Operation to follow.

Figure 8:
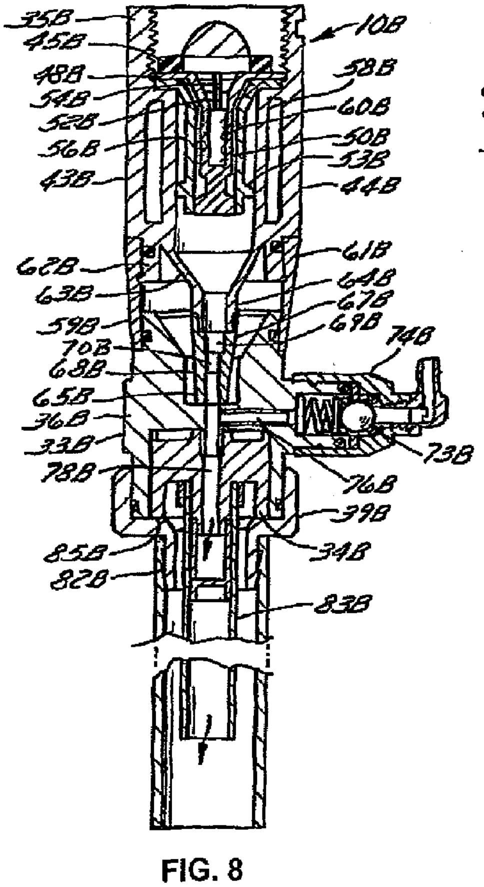
FIG. 8 is a sectional view of another embodiment of the invention.
Figure 9:
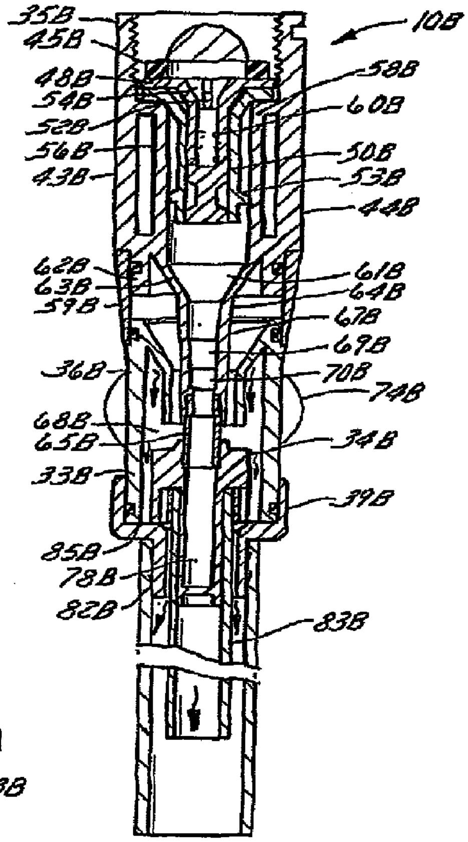
FIG. 9 is a view similar to FIG. 8 with the embodiment turned 45 degrees.

Referring to FIGS. 8 and 9, eductor 10B differs from eductor 10A in the configuration and connection between the first flow guide 64B and the second flow guide 67B. Other differences are the one piece molding of outer casing 5813 with ribs 43B and 44A and the additional connecting portion 62B between the inlet section 35B and venturi section 36B.

Figure 10:
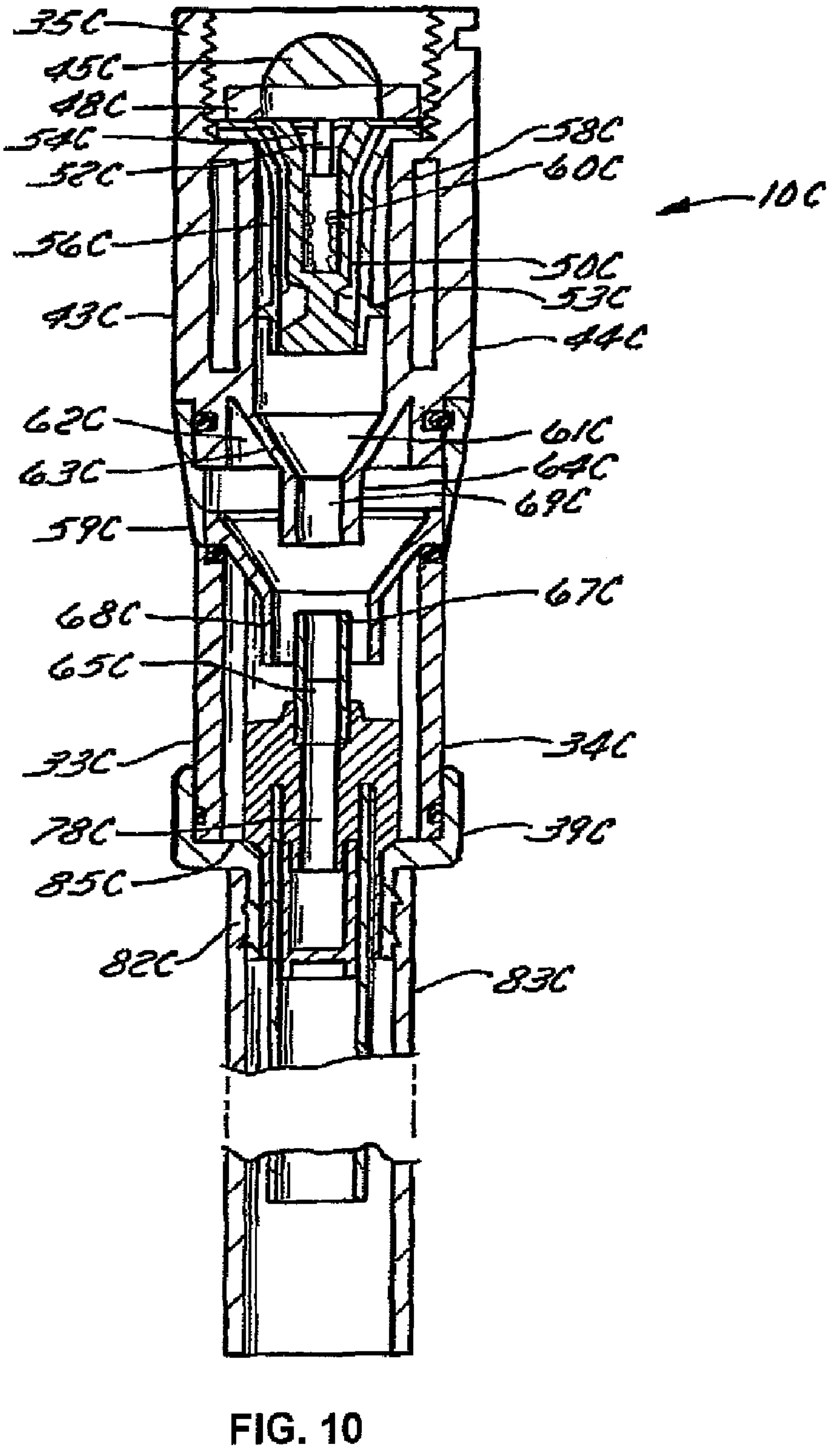
FIG. 10 is a view similar to FIG. 9 showing another embodiment of the invention.

As shown in FIG. 10, eductor 10C differs from the other eductors 10, 10A and 10B in that there is no window in the second flow guide 67C. Instead the first flow guide 64C is spaced from the second flow guide 67C. This provides a diversion of water away from venturi tube 65C.

Operation

A better understanding of the eductors 10, 10A, 10B and 10C will be had by a description of their operation. Referring first to eductor 10, and FIGS. 3 and 5-7, it will be connected into the dispensing equipment 11 as previously described in conjunction with FIG. 1. Water flows into branch pipe 25 and into inlet section 35. From there it flows through fluid outlets 54 and between barrel 50 and resilient sleeve 56. It then flows through outlet passage 61, into funnel member 64, after which it flows into passage portion 69, over opening 70 and into venturi tube 65. As the water passes into venturi tube 65 it creates a reduction in pressure sufficient to open ball check valve assembly 74 and draw a chemical concentrated from a container 15 into inlet connection 73 and into channel 76. From channel 76 it is mixed with water flowing through passage 78. The combined solution of water and concentrate exits through outlet fitting 39 and outlet tube 29 providing a discharge passage as seen in FIG. 1.

The purpose of ball check valve assembly 74 is to serve as a primer for the vacuum in passage 76 and keep prime on the container 15. It also prevents pressurized water from source to contaminate concentrate to chemical from inlet 73.

An important aspect of eductor 10 is the positioning of funnel portion 80 in conjunction with opening 70. This controls the amount of water flowing through the venturi tube 65 and accordingly, the amount of negative pressure created therein. It will be appreciated that the greater the extension of the funnel stem over the opening 70, the greater the volume of water will flow into the venturi tube 65, and the greater the negative pressure. Diverted water passes through the opening 70 and forms a secondary stream which passes into the chamber 68 and subsequently into outlet port 71, whereafter it is combined with the stream of water and chemical concentrate exiting from passage 78. This concentric flow of the secondary stream and the primary stream through the venturi tube 65 is illustrated in U.S. Pat. No. 5,927,338. It is also described in conjunction with eductor 10B in FIG. 9.

Eductors 10A and 10B function in substantially the same manner as described for eductor 10. Instead of funnel stem 80 covering a portion of the opening 70, the openings 70A and 70B are designed with specific dimensions to direct a predetermined amount of water away from the venturi tubes 65A and 65B and thus effect a desired vacuum. FIG. 9 is presented to show the secondary stream which forms as a result of water being diverted from the venturi tube 65B. The stream will flow outwardly into chamber 68B and follow the path shown by the arrows until it exits into hose 82B. At the same time chemical concentrate diluted by the water passing through venturi tube 65B will exit in tube 83B. As stated previously, this flow of a primary and a secondary stream of water and diluted chemical concentrate and a secondary stream of water is described in U.S. Pat. No. 5,927,338.

The eductor 10C shown in FIG. 10 operates without an opening 70. It relies on the spacing of first flow guide 64C from the second flow guide 67C to divert water away from the venturi tube 65C and thereby create the desired vacuum effect. This is a unique feature as it has never been done before in conjunction with a non-air gap eductor.

The siphon-breaking air gap provided by barrel 50 and resilient sleeve 56 operates in the manner described in the previously referred to PCT Application No. PCT/US03/08428. As water flows through fluid outlets 54, it will expand sleeve 56 and water will flow between the sleeve and barrel 50 into funnel member 64 and ultimately to venturi tube 65. When there is no flow of water from the water supply 21 and 25, the resilient sleeve 56 contracts and fits lightly around the barrel 50 to prevent any reverse flow of water. If a siphon action occurs in the water lines 21 and 25, such as when there is a sudden drop in pressure of the main water supply, the resilient sleeve 56 is already sealed against the barrel 50, as already discussed. Fluid instead passes into the space between the sleeve 56 and the outer casing 58 and exits through the vents 60.

It will then be seen that there is now provided an eductor wherein the vacuum profile can be changed without redesigning the entire venturi.

The eductors 10 and 10A have been shown with two inlet ports or connections 72 and 73. If desired, only one could be used as shown in conjunction with eductor 10B. In that instance, the other would be plugged. Alternatively, the inlet connections can be connected to two containers 15 each with the same liquid chemical concentrate or, alternatively, with different chemical concentrate. Ribs 43A, 44A and inlet section 35A are shown as one piece and outer casing 58 as another. If desired, these could be molded from a suitable plastic material as one piece as indicated in FIGS. 8, 9 and 10. Other variations and modifications of this invention will be obvious to those skilled in the art. This invention is not to be limited except as set forth in the following claims.

The invention claimed is:

1. A method of establishing a vacuum profile in a non-air gap eductor including an inlet port, an outlet port, and a venturi tube disposed between the inlet port and the outlet port, the method comprising:

receiving water via the inlet port from a source;

directing a first portion of the water along a first flow path extending longitudinally through a first flow guide and a second flow guide of the eductor, the first portion of the water flowing through the venturi tube toward the outlet port;

reducing pressure within the eductor along the first flow path in response to the first portion of water flowing through the venturi tube;

directing a second portion of the water along a second flow path offset from the first flow path;

controlling the amount of water flowing along the second flow path based at least in part upon the position of the second flow guide relative to the first flow guide; and creating a desired vacuum based upon the amount of water directed along the second flow path.

2. The method of claim 1, wherein directing the second portion of the water along the second flow path includes diverting water from the first flow path to the second flow path.

3. The method of claim 1, further comprising opening a valve assembly of the eductor in response to the reduced pressure; and drawing a chemical concentrate into the first flow path upstream of the outlet port.

4. The method of claim 3, further comprising recombining the water directed along the second flow path with the water and the chemical concentrate directed along the first flow path.

5. The method of claim 1, further comprising dividing the water among the first flow path and the second flow path adjacent an inlet to the venturi tube.

6. The method of claim 1, wherein the venturi tube and the second flow guide are connected by a passage portion having an opening, the method further comprising modifying the opening to create the desired vacuum.

7. The method of claim 6, wherein controlling the amount of water flowing along the second flow path includes positioning a funnel portion of the first flow guide relative to the opening, the method further comprising controlling the amount of water flowing through the venturi tube.

8. A method of establishing a vacuum profile in a non-air gap eductor including an inlet port, an outlet port, and a venturi tube disposed between the inlet port and the outlet port, the method comprising:

directing a first portion of water along a first flow path extending longitudinally through a first flow guide that converges the water, and a second flow guide of the eductor that receives water from the first flow guide, the first portion of water flowing through the venturi tube toward the outlet port;

reducing pressure within the eductor along the first flow path in response to the portion of water flowing through the venturi tube;

directing a second portion of water along a second flow path offset from the first flow path;

controlling the amount of water flowing along the second flow path based at least in part upon the position of the second flow guide relative to the first flow guide;

combining the water directed along the second flow path with the water directed along the first flow path; and creating a desired vacuum based on the amount of water directed along the second flow path.

9. The method of claim 8, wherein directing the second portion of water along the second flow path includes diverting a portion of the water directed along the first flow path to the second flow path, and wherein combining the water includes rejoining the water directed along the first flow path with the water directed along the second flow path upstream of the outlet port.

10. The method of claim 8, further comprising opening a valve assembly of the eductor in response to the reduced pressure; and drawing a chemical concentrate into the first flow path upstream of the outlet port.

11. The method of claim 8, further comprising dividing the water among the first flow path and the second flow path adjacent an inlet to the venturi tube.

12. The method of claim 8, wherein the venturi tube and the second flow guide are connected by a passage portion having an opening, the method further comprising modifying the opening to create the desired vacuum effect.

13. The method of claim 12, wherein controlling the amount of water flowing along the second flow path includes positioning a funnel portion of the first flow guide relative to the opening, the method further comprising controlling the amount of water flowing through the venturi tube.

14. A method of establishing a vacuum profile in a non-air gap eductor including an inlet port, an outlet port, and a venturi tube disposed between the inlet port and the outlet port, the method comprising:

receiving water via the inlet port from a source;

directing a first portion of the water along a first flow path extending longitudinally through a first flow guide and a second flow guide of the eductor, the first portion of water flowing through a passage portion connecting the second flow guide to the venturi tube and toward the outlet port;

reducing pressure within the eductor along the first flow path in response to the portion of water flowing through the venturi tube;

directing a second portion of the water laterally through an opening in the passage portion and along a second flow path offset from the first flow path;

controlling the amount of water flowing along the second flow path based at least in part upon the size of the opening; and creating a desired vacuum based on the amount of water directed along the second flow path.

15. The method of claim 14, wherein directing the second portion of the water along the second flow path includes diverting water from the first flow path to the second flow path.

16. The method of claim 14, further comprising opening a valve assembly of the eductor in response to the reduced pressure; and drawing a chemical concentrate into the first flow path upstream of the outlet port.

17. The method of claim 16, further comprising combining the water directed along the second flow path with the water and the chemical concentrate directed along the first flow path upstream of the outlet port.

18. The method of claim 14, further comprising dividing the water from the inlet port among the first flow path and the second flow path adjacent an inlet to the venturi tube.

19. The method of claim 14, further comprising positioning a funnel portion of the first flow guide relative to the opening to control the amount of water flowing through the venturi tube.

20. The method of claim 14, further comprising expanding a resilient sleeve in response to a flow of water through the inlet port; and contracting the resilient sleeve when no water flows through the inlet port to prevent a reverse flow of water.

* * * * *